July 14, 1931.  F. A. FAHRENWALD  1,814,082
ROLLER TYPE CONVEYER FOR HEAT TREATMENT FURNACES
Filed Jan. 19, 1929
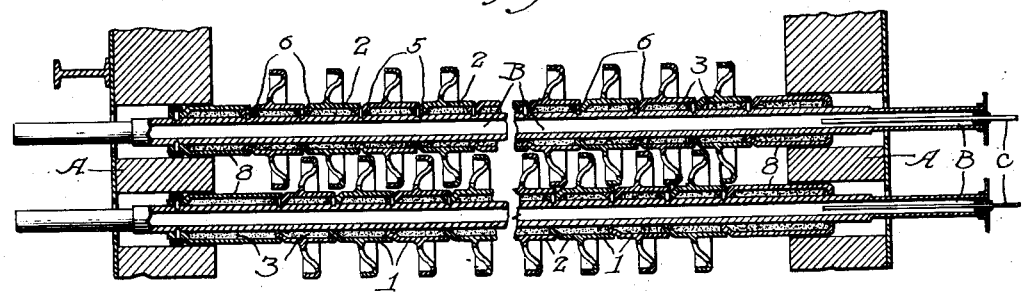
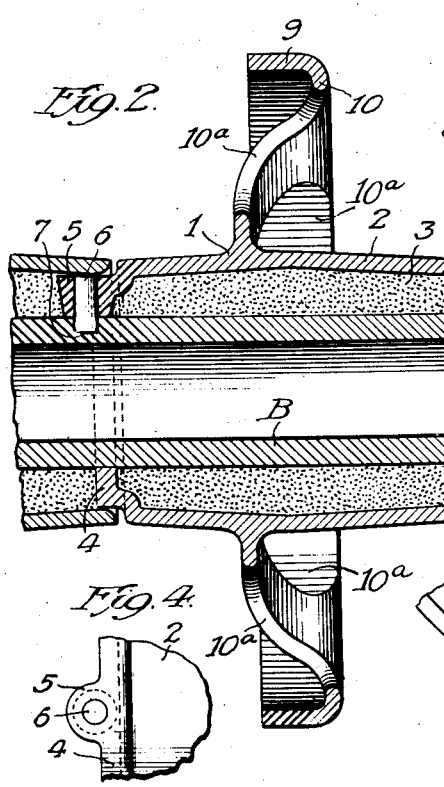
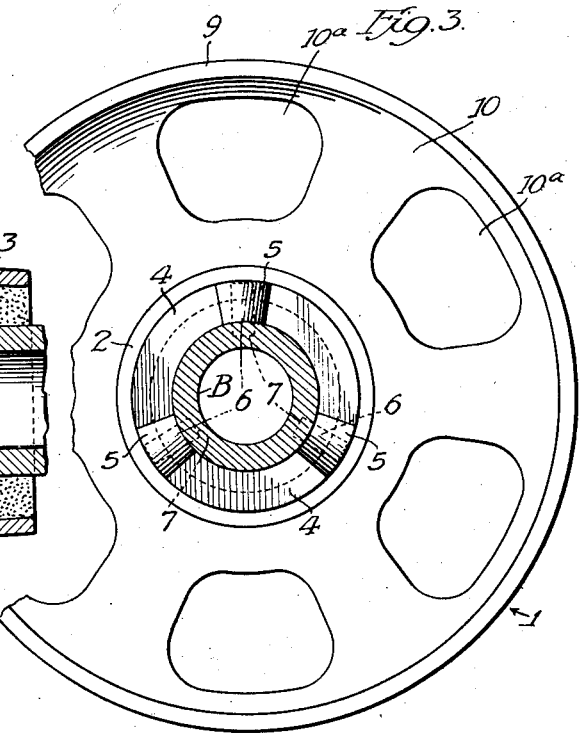
Inventor:
Frank A. Fahrenwald,
By Wilkinson, Huxley, Byron & Knight
Attys.
Witness:
R. B. Davison Patented July 14, 1931

1,814,082

UNITED STATES PATENT OFFICE

FRANK A. FAHRENWALD, OF CHICAGO, ILLINOIS

ROLLER TYPE CONVEYER FOR HEAT TREATMENT FURNACES

Application filed January 19, 1929. Serial No. 333,543.

This invention relates to the means employed for conveying sheets or other articles of metal through a furnace as an incident to subjecting the articles to heat treatment, and particularly to conveyers of the roller type in which, for the purpose of preventing transmission of heat from the shaft of the conveyer to the conveyer units mounted thereon, the conveyer unit is constructed with a hub having an internal diameter that is materially greater than the external diameter of the shaft, so that atmospheric or other barrier against heat transmission may exist between the hub and the shaft, and the conveying unit receives its support through the medium of spacing means having dimensions that render it of low heat conducting capacity.

In my application Serial No. 285,049 I have shown, described, and claimed conveying units of the kind above referred to, assembled upon a shaft by means of fingers or spacing lugs restricted both in circumferential and axial direction so as to reduce the capacity for heat conduction between the hub and the shaft, but sufficient in number to sustain the hub upon the shaft, one end of each hub being free from such spacing means and receiving its support by entering it into telescopic centering engagement with the hub of an adjacent unit, driving connection being established between each hub and the shaft through means of a radial pin or pins inserted through a spacing lug or lugs and confined therein by the overlapping portion of an adjacent hub.

In my application Serial No. 326,513 I have shown a conveying unit for conveyers of the kind described, in which for the sake of permitting changes of dimension in response to temperature changes, the supporting means which integrally unites the rim to the hub is in the form of a web which, in radial section in a plane of the axis, extends in a serpentine, diagonal, or other indirect manner between the rim and the hub, and is provided with an annular series of openings that collectively reduce to a material degree the total conducting section of the web, and thereby reduce heat losses from the rim toward the shaft; the hub, however, in the illustrative embodiment, being in direct contact with the shaft.

The object of the present invention is to provide a still further improvement in the conveying disks or units of a conveyer of the kind referred to, and particularly one in which the hub can be made of materially greater diameter than the shaft upon which it is intended for use, and the means for spacing the hub from the shaft can, without undesirable heat losses, be made substantially continuous in the circumferential direction without sacrificing its utility as a drive transmitting means, and with the advantage of making an effective end closure for confinement of physical insulation which is preferably employed in the space between the hub and the shaft; also to provide means whereby the relatively thin or shell-like hub with its axially restricted support upon the shaft can be saved from destructive stresses resulting from temperature changes. To these ends the present invention consists in giving to the hub member of each conveying unit and, if desired, to the sleeve-like spacing members at the end of the series of conveying units on each shaft, an internal diameter materially greater than the external diameter of the shaft, and constructing each of these members with a flange extending inwardly from the member and seating upon the shaft so as to support the member from the shaft with an intervening insulation space; this flange being circumferentially continuous so as to close the insulation space at one end, and being substantially the same in thickness as the member which it supports, so as to form with the latter a continuing piece of metal of approximately uniform thickness that eliminates destructive stresses due to high temperatures; and each flange carrying its own independent driving connection with the shaft, such, for instance, as a swell or enlargement of limited circumferential dimension but sufficient transverse dimension to adapt the flange to receive a bore in which may be introduced the anchoring pin or pins, in accordance with my application Serial No. 285,049 referred to; the disk-like units being also constructed, preferably, in radial planes intermediate of their ends with webs integrally uniting their hubs with their rims, which webs are so designed that in axial section they extend indirectly, for instance, in approximately diagonal curved lines from the hub to the rim so as to adapt them to absorb stresses set up in them by changes in temperature which I have described in my aforesaid application Serial No. 326,513, but with the further advantage in the present instance of permitting the hub member to be made of relatively thin radial dimension without danger of checking under heat stresses, as well as compensating for stresses set up in the rim of the unit. With such a construction of conveyer unit, there is a complete closure of the hub space through means of the driving and supporting flange at one end and a closure at the opposite end through means of the driving and supporting flange of an adjacent unit with which the open end of the unit fits telescopically, so that each unit may be packed separately with insulating material and may retain its insulation without tendency of the material to escape endwise under vibration incident to operation of the furnace.

In the accompanying drawings, in which the preferred embodiment of the invention is shown by way of illustration—

Figure 1 is a view in horizontal axial section of a pair of adjacent artificially cooled furnace shafts supported in fragments of opposite walls of the furnace and equipped with conveying units embodying the subject-matter of the present invention.

Figure 2 is a detail view of a portion of Figure 1 on a greatly enlarged scale.

Figure 3 is an end elevation of the complete unit shown in Figure 2; and

Figure 4 is a detail view showing a portion of the hub supporting and spacing flange through which the anchoring pin is introduced in establishing drive between the unit and the shaft.

A represents portions of the walls of a heat treatment furnace, and B two shafts mounted therein in a conventional manner and provided, if desired, with cooling means suggested by the concentric shafts C introduced into the ends of pipes at one side of the furnace.

Mounted upon the shaft B are conveyer units 1, each of which, as more clearly shown in Figure 2, comprises a hub 2 having an internal diameter which is sufficiently greater than the external diameter of the shaft B to provide an insulating space 3. At one end the hub 2 is provided with a supporting flange 4 which is substantially continuous in the circumferential direction, extends radially inward from the hub, and is suitably dressed at its inner periphery to adapt it to seat upon the shaft B. In order that flange 4 may serve as a driving as well as a spacing element, it is provided at one or more points in its circumference with a radial enlargement 5 cored to receive an anchoring pin 6 which extends radially into the shaft, as shown at 7. At its end opposite the spacing and supporting flange 4, the hub 2 is open and unobstructed and this adapts it to enter into telescopic assembly with the end of an adjacent conveyer unit or the end of an end-spacing sleeve 8 which carries a supporting flange, and by such telescopic assembly the open end of the hub is adapted to confine pin 6 against displacement.

Each conveyer unit also includes a rim 9 upon which the sheets or other heat treated bodies are supported, and inasmuch as the relatively thin shell-like hub 2 may be subjected to very serious stresses by expansion and contraction of rim 9 under changes of temperature as well as for the purpose of saving the rim itself from undesired stresses, rim 9 is united with hub 2 through means of a web 10 which has a dished or concavo-convex form as shown, or otherwise rendered indirect in radial section in its extension from the rim to the hub, the particular design shown being in the nature of a curved diagonal. This method of forming the connecting disk adapts the latter to yield to stresses in the hub and rim and protect each from destructive stresses set up by the other or by its own expansion.

As shown in Figure 3, the web 10 is provided with a suitable number of openings 10a to largely decrease the total sectional area of the web and consequent heat conducting capacity, and also to impose less obstruction to convecting gases in the furnace and avoid undesired cooling of the rim or portion of the unit which comes in contact with the metal which is to be treated. These openings 10a are preferably of materially less dimension in the radial direction of the conveying unit than the distance between the rim and the hub in order to leave circumferentially continuous portions of the web adjacent to the rim and hub.

A conveyer unit as herein described is particularly well adapted for the introduction of insulation into the space 3 between the hub and the shaft, and it may be more conveniently packed with such insulation because of the possibility of treating each unit individually and where the space between the several hubs and the shaft is open from end to end of the shaft. By suitably molding the insulation in the hub space from material adapted to retain its shape, each unit may be packed with insulation before slipping it over the end of the shaft.

I do not herein claim the feature of my invention which consists in extending one end of the hub inwardly in the form of a flange to provide a support upon the shaft for the dual purpose of providing an end closure for the space between the hub and the shaft and providing a continuous support of the hub, and particularly the species of hub-supporting flange which is so related as a continuance of the hub as will avoid abrupt changes in direction and consequent checking of the casting. These features are included in my application Serial No. 501,257, filed December 10, 1930, and will be claimed therein.

I claim:

1. In a conveyer unit for heat treatment furnaces, a hub having means for supporting it upon a shaft at a material distance from the shaft, a rim, and a web uniting the rim and hub, having a radial section which extends indirectly between the hub and the rim.

2. In a conveyer unit for heat treatment furnaces, a hub having means for supporting it upon a shaft at a material distance from the shaft, a rim, and a web connecting the rim with the hub; said web, in radial section, extending in a substantially diagonal direction.

3. In a conveyer unit for heat treatment furnaces, a hub having means for supporting it upon a shaft at a material distance from the shaft, a rim, and a web connecting the rim with the hub; said web being concavo-convex.

4. In a conveyer unit for heat treatment furnaces, a hub having means for supporting it upon a shaft at a material distance from the shaft, a rim, and a web connecting the rim with the hub; said web being concavo-convex and having through its wall an annular series of openings.

5. In a conveyer unit for heat treatment furnaces, a hub having means for supporting it upon a shaft at a material distance from the shaft, a rim, and a web connecting the rim with the hub; said web, in radial section, extending in a substantially angular direction relatively to a plane perpendicular to the axis of the conveyer unit, and said web having through its wall an annular series of openings, the dimensions of which, in a direction radial to the conveyer unit, is materially less than the distance between the hub and the rim.

Signed at Chicago, Illinois, this 14th day of January, 1929.

FRANK A. FAHRENWALD.